United States Patent
Korman et al.

(10) Patent No.: US 9,781,449 B2
(45) Date of Patent: Oct. 3, 2017

(54) RATE DISTORTION OPTIMIZATION IN IMAGE AND VIDEO ENCODING

(75) Inventors: Mikhail Korman, St. Petersburg (RU); Andrey Sinitskiy, St. Petersburg (RU)

(73) Assignee: Synopsys, Inc., Mountain View, CA (US)

( * ) Notice: Subject to any disclaimer, the term of this patent is extended or adjusted under 35 U.S.C. 154(b) by 1253 days.

(21) Appl. No.: 13/448,224

(22) Filed: Apr. 16, 2012

(65) Prior Publication Data

US 2013/0089137 A1    Apr. 11, 2013

(30) Foreign Application Priority Data

Oct. 6, 2011  (RU) .................. 2011140631

(51) Int. Cl.
*H04N 19/85*    (2014.01)
*H04N 19/157*   (2014.01)
*H04N 19/126*   (2014.01)
*H04N 19/124*   (2014.01)
*H04N 19/19*    (2014.01)
*H04N 19/159*   (2014.01)
*H04N 19/147*   (2014.01)

(52) U.S. Cl.
CPC ......... *H04N 19/85* (2014.11); *H04N 19/124* (2014.11); *H04N 19/126* (2014.11); *H04N 19/157* (2014.11); *H04N 19/19* (2014.11); *H04N 19/147* (2014.11); *H04N 19/159* (2014.11)

(58) Field of Classification Search
CPC .... H04N 19/19; H04N 19/124; H04N 19/176; H04N 19/85; H04N 19/157; H04N 19/126
See application file for complete search history.

(56) References Cited

U.S. PATENT DOCUMENTS

| 5,265,180 | A |   | 11/1993 | Golin |
|-----------|---|---|---------|-------|
| 5,664,057 | A |   | 9/1997  | Crossman et al. |
| 5,691,770 | A | * | 11/1997 | Keesman et al. ........ 375/240.04 |
| 5,768,436 | A | * | 6/1998  | Keesman ...................... 382/248 |
| 5,778,192 | A | * | 7/1998  | Schuster et al. .............. 709/247 |

(Continued)

OTHER PUBLICATIONS

T. Wiegand, G. Sullivan, G. Bjontegaard, & A. Luthra, "Overview of the H.264/AVC Video Coding Standard", 13 IEEE Transactions on Circuits & Sys. 560-576 (Jul. 2003).*

(Continued)

*Primary Examiner* — David N Werner
(74) *Attorney, Agent, or Firm* — Fenwick & West LLP

(57) ABSTRACT

An offline quantization module is used to optimize a rate-distortion task. The offline quantization module calculates a quantization kernel for a range of computable block parameters and a range of rate-distortion slope values representing the rate and complexity of a coded video. A quantization kernel is utilized by an encoder application for content-adaptive quantization of transformed coefficients. The quantization kernel includes a block data model, a quality metric model, and an entropy coding model. The quantization kernel is suitable for existing and future coding standards. A rate-distortion slope selection process is performed on a per-frame basis for improved rate-distortion performance. The slope is selected by referring to the block model parameter value within the quantization kernel.

19 Claims, 6 Drawing Sheets

(56) References Cited

U.S. PATENT DOCUMENTS

| | | | |
|---|---|---|---|
| 5,832,131 A | 11/1998 | Choo et al. | |
| 6,084,908 A * | 7/2000 | Chiang et al. | 375/240.03 |
| 6,704,455 B1 | 3/2004 | Yamazaki et al. | |
| 7,899,263 B2 | 3/2011 | Li et al. | |
| 8,014,447 B2 * | 9/2011 | Hinz et al. | 375/240.03 |
| 8,115,804 B2 * | 2/2012 | Yang | 348/47 |
| 8,149,918 B2 * | 4/2012 | Seok et al. | 375/240.24 |
| 8,351,723 B2 | 1/2013 | Richter | |
| 8,510,458 B2 | 8/2013 | Nassor et al. | |
| 8,594,187 B2 * | 11/2013 | Chen et al. | 375/240.03 |
| 2004/0006644 A1 | 1/2004 | Henocq et al. | |
| 2004/0120397 A1 * | 6/2004 | Zhang et al. | 375/240.03 |
| 2004/0131121 A1 * | 7/2004 | Dumitras et al. | 375/240.16 |
| 2005/0157784 A1 * | 7/2005 | Tanizawa et al. | 375/240.03 |
| 2006/0098733 A1 * | 5/2006 | Matsumura et al. | 375/240.03 |
| 2006/0133479 A1 | 6/2006 | Chen et al. | |
| 2006/0133481 A1 * | 6/2006 | Chujoh | H04N 19/176 375/240.03 |
| 2006/0188014 A1 | 8/2006 | Civanlar et al. | |
| 2007/0036213 A1 | 2/2007 | Matsumura et al. | |
| 2007/0064793 A1 * | 3/2007 | Wang et al. | 375/240.03 |
| 2007/0140334 A1 * | 6/2007 | Sun | 375/240.03 |
| 2007/0153982 A1 * | 7/2007 | Bloebaum | H04M 3/42 379/33 |
| 2007/0171728 A1 * | 7/2007 | Cho | G11C 16/16 365/185.29 |
| 2008/0056354 A1 * | 3/2008 | Sun | H04N 19/176 375/240.12 |
| 2008/0063051 A1 * | 3/2008 | Kwon et al. | 375/240.03 |
| 2008/0212677 A1 * | 9/2008 | Chen | H04N 19/176 375/240.16 |
| 2010/0166251 A1 | 7/2010 | Baudry et al. | |
| 2010/0238997 A1 * | 9/2010 | Yang | H04N 19/105 375/240.03 |
| 2011/0007968 A1 | 1/2011 | Yamada | |
| 2011/0043604 A1 | 2/2011 | Peleg et al. | |
| 2011/0103473 A1 * | 5/2011 | Li | H04N 19/176 375/240.12 |
| 2011/0142124 A1 * | 6/2011 | Huang | H04N 19/154 375/240.02 |
| 2011/0194615 A1 * | 8/2011 | Zheludkov | H04N 19/176 375/240.24 |
| 2012/0201475 A1 | 8/2012 | Carmel et al. | |

OTHER PUBLICATIONS

M. Jiang & N. Ling, "On Lagrange Multiplier and Quantizer Adjustment for H.264 Frame-Layer Video Rate Control", 16 IEEE Transactions on Circuits & Sys. for Video Tech. 663-669 (May 2006).*

G.J. Sullivan & T. Wiegand, "Rate-Distortion Optimization for Video Compression", 15 IEEE Signal Processing Magazine 74-90 (Nov. 1998).*

S. Ma, W. Gao, P. Gao, & Y. Lu, "Rate Control for Advance Video Coding (AVC) Standard", II Proceedings of the 2003 Int'l Symposium on Circuits & Sys. (ISCAS '03) 892-895 (May 2003).*

C.S. Kannangara, I.E.G. Richardson, M. Bystrom, J.R. Solera, Y. Zhao, A. MacLennan, & R. Cooney, "Low-Complexity Skip Predication for H.264 Through Lagrangian Cost Estimation", 16 IEEE Transactions on Circuits & Sys. for Video Tech. 202-208 (Feb. 2006).*

T. Wiegand & B. Girod, "Lagrange Multiplier Selection in Hybrid Video Coder Control", 3 Proceedings of 2001 Int'l Conf. on Image Processing 542-545 (Oct. 2001).*

* cited by examiner

RATE DISTORTION OPTIMIZATION IN IMAGE AND VIDEO ENCODING

CROSS REFERENCE TO RELATED APPLICATIONS

This application claims the right of priority based on Russian application serial no. 2011140631, filed Oct. 6, 2011, which is incorporated by reference in its entirety. This application is related to U.S. patent application Ser. No. 13/451,413, titled "Improved Visual Quality Measure for Real-Time Video Processing", filed on Apr. 19, 2012, which is incorporated by reference herein in its entirety.

BACKGROUND

Field of Disclosure

This disclosure relates in general to the field of digital video and in particular to scalar quantization and rate control in a real time video codec.

Description of the Related Art

Raw digital video streams often consume immense digital storage space, and are prohibitively massive for transmission. To reduce storage space or transmission bandwidth requirements, a raw video stream is encoded to reduce its size. Typical video encoding involves the process of subtracting a reference frame from an original frame of video to obtain a residual frame containing less information than the original frame. Residual frames are then further processed to obtain a compressed digital video stream for transmission or storage. A typical video decoder receives the compressed digital video stream and decompresses the compressed digital video into the original video stream or a downgraded version of the digital video stream.

In the field of video coding, proper quantization parameter selection is an important consideration in encoding video frames in a video stream. Improved quantization parameter construction can improve the quality of the video and/or reduce the bandwidth used to transmit video of a given quality. A selected quantization parameter is typically maintained throughout the video coding process regardless of whether a new coding mode is considered, the signal model is changed, or a new distortion metric is introduced. This may introduce inefficiencies in rate-distortion performance.

SUMMARY

Embodiments relate to content-adaptive selection of quantization parameters for encoding which uses mapping of block model parameters to quantization parameters to obtain quantization parameters suitable for characteristics and properties of a raw video frame. A Lagrange multiplier value for the raw video frame is selected and used for determining quantization parameters for the raw video frame. The raw video frame is encoded by performing quantization based on the quantization parameters.

In one embodiment, the mapping of the block model parameters to the quantization parameters are computed offline before performing encoding to reduce the amount of computation during encoding. During encoding, the mapping is referenced to determine quantization parameters appropriate for a raw video frame.

DETAILED DESCRIPTION

The Figures (FIGS.) and the following description describe certain embodiments by way of illustration only. Reference will now be made in detail to several embodiments, examples of which are illustrated in the accompanying figures. It is noted that wherever practicable similar or like reference numbers may be used in the figures and may indicate similar or like functionality.

Embodiments relate to selection of quantization parameters depending on the content of individual video frames in a video stream to provide improved rate-distortion performance. A model or mapping of block model parameters to quantization parameters is generated offline and made available for encoding in real-time based on the content and characteristics of the video frames. Among other advantages, embodiments provide improved rate-distortion performance and enable real-time encoding by reducing required calculations.

A block described herein refers to a group of pixels within an image in a spatial pixel domain or a group of coefficients in a transform domain. In a spatial pixel domain, a block may include information about luminance or chrominance values for a set of pixels. A block may be a group of pixels of any size (e.g., 4×4 pixels or 8×8 pixels) in the spatial pixel domain. In a transform domain, blocks may be a group of transform coefficients of any size within an image.

Block model parameters described herein refer to a set of parameters which represent computable characteristics which are calculated or approximated from properties of a macroblock in a raw video frame. Block model parameters may also include aggregated characteristics of multiple macroblocks in a raw video frame. Aggregated characteristics of multiple macroblocks may include averaged characteristics or aspects of otherwise aggregated characteristics from multiple macroblocks. For example, estimators derived from a Gaussian distribution of block data may be utilized as block model parameters. The block model parameters may include, for example, Sum of Absolute Differences (SAD) values and Average Absolute Deviation (DEV) values. In one embodiment, the block model parameters are computed real time during an encoding process.

Quantization model parameters described herein refers to operating parameters associated with performing quantization during an encoding process. The quantization parameters may include quantization thresholds and quantization invariants.

The term "offline" as described herein indicates that an operation is performed in a separate process before an encoding process. In one embodiment, output of the offline quantization module is generated prior to the encoding process occurring and without knowledge of the current video frame or stream being encoded.

Overview of Process

Figure 1:
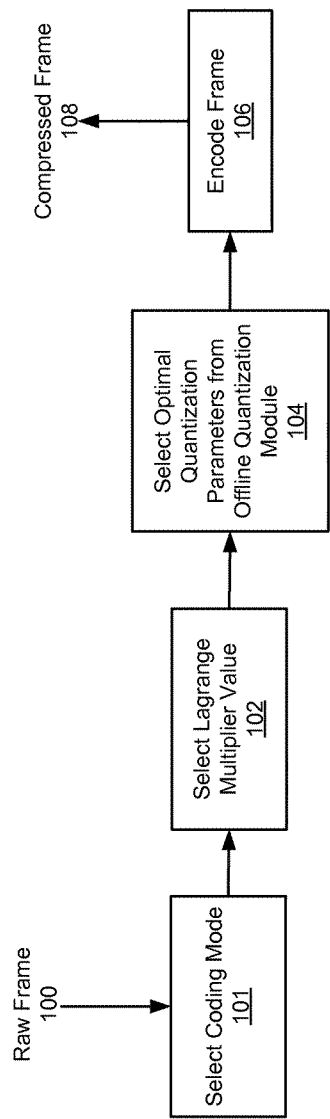
FIG. 1 is a flowchart illustrating an overall process for encoding a raw video frame, according to one embodiment.

FIG. 1 is a flowchart illustrating an overall process for encoding a raw video frame, according to one embodiment. First, a coding mode is selected 101 based on a Lagrange multiplier and estimated block model parameters taken from previous frames. If the raw frame 100 is an initial video frame (not preceded by other video frame), a predetermined initial value for the Lagrange multiplier is selected during encoder initialization without reference to any previous frame (since no previous frame is available) and used during mode selection. Then, a Lagrange multiplier value representing the relationship between frame distortion and bit rate is selected 102 based on block model parameters from the raw image 100 and other previous frames received at the encoder. In addition, a histogram of Sum of Absolute Differences for previous frames may be considered in Lagrange multiplier selection.

In one embodiment, the statistics of the frames are computed in real time during the encoding. By selecting the Lagrange multiplier value based on the real time analysis of video frames, rate-distortion performance of the encoder can be improved compared to encoders using a constant Lagrange multiplier value for different video frames.

The encoder then selects 104 quantization parameters corresponding to the frame distortion and bit rate values at an offline quantization module, as described below in detail with reference to FIGS. 3 and 4. The quantization parameters for frame distortion and bit rate values are computed and stored offline and made available during encoding to reduce computation during real time encoding.

The encoder then applies the retrieved quantization parameters to encode 106 the current frame and produce a compressed frame 108.

Example Operating Environment

Figure 2:
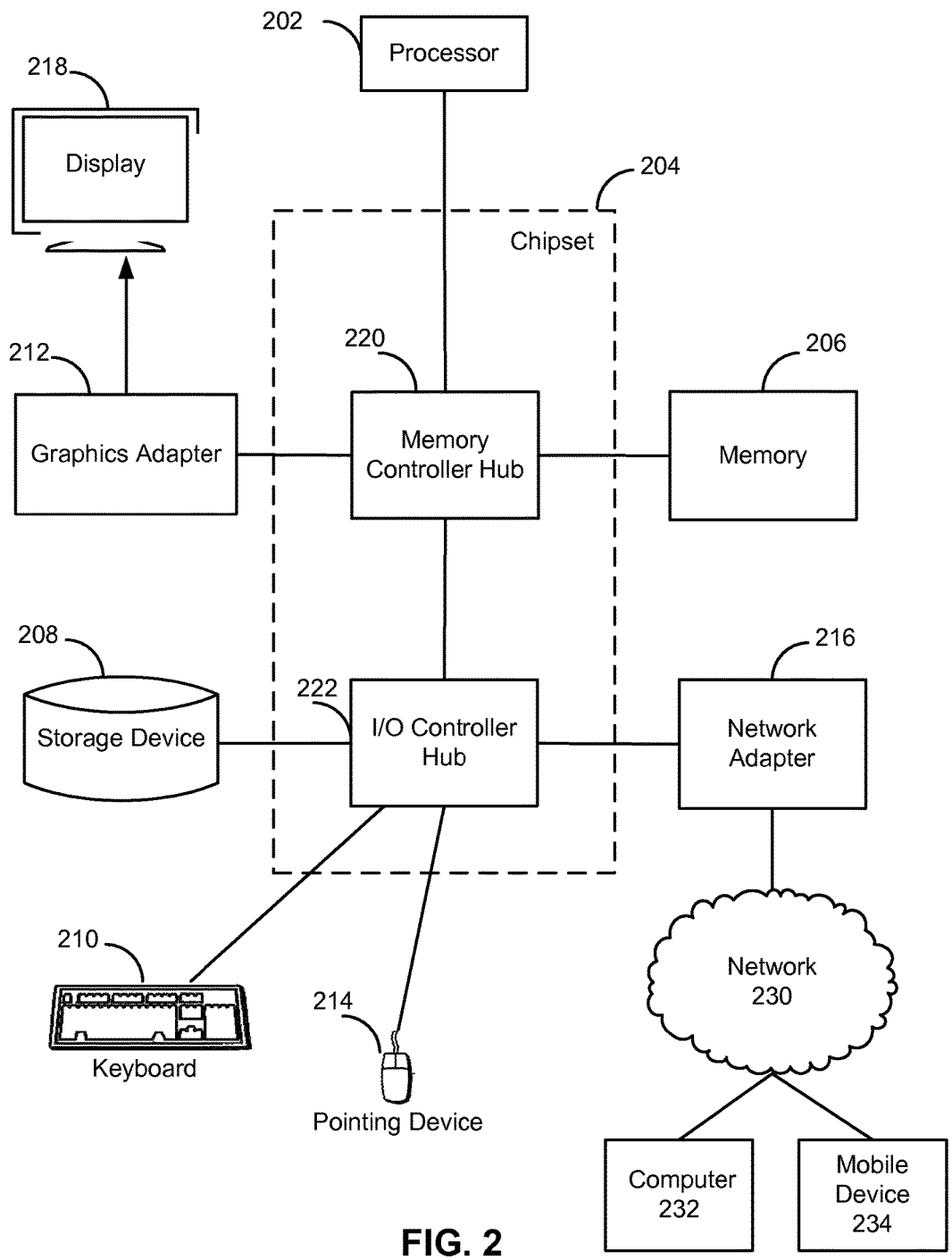
FIG. 2 is a high-level block diagram illustrating a typical environment for content adaptive selection of quantization parameters, according to one embodiment.

FIG. 2 is a high-level block diagram illustrating a typical environment for content adaptive selection of quantization parameters, according to one embodiment. Illustrated are at least one processor 202 coupled to a chipset 204. Also coupled to the chipset 204 are a memory 206, a storage device 208, a keyboard 210, a graphics adapter 212, a pointing device 214, and a network adapter 216. The network adapter 216 is communicatively coupled to computer 232 and mobile device 234 through network 230. A display 218 is coupled to the graphics adapter 212. In one embodiment, the functionality of the chipset 204 is provided by a memory controller hub 220 and an I/O controller hub 222.

In another embodiment, the memory 206 is coupled directly to the processor 202 instead of the chipset 204, or is located within processor 202, such as in a system-on-a-chip environment. In such embodiments, the operating environment may lack certain components, such as chipset 204, storage device 208, keyboard 210, graphics adapter 212, pointing device 214, network adapter 216 and display 218. Processor 202 may be a special-purpose dedicated processor, such as an Application-Specific Integrated Circuit (ASIC), or a customizable general-purpose processor, such as a Field-Programmable Gate Array (FPGA). Processor 202 may also be embodied as a commercially available Central Processing Unit (CPU) or (Graphics Processing Unit (GPU), with one or more processor cores.

The storage device 208 is a non-transitory computer-readable storage medium, such as a hard drive, compact disk read-only memory (CD-ROM), DVD, or a solid-state memory device. The memory 206 may contain, among other data, instructions and data used by the processor 202. The pointing device 214 is a mouse, track ball, or other type of pointing device, and is used in combination with the keyboard 210 to input data into the computer system. The graphics adapter 212 displays images and other information on the display 218. The network 230 enables communications between the processor 202, computer 232 and mobile device 234. In one embodiment, the network 230 uses standard communications technologies and/or protocols and can include the Internet as well as mobile telephone networks.

Additional modules not illustrated in FIG. 2 may also be present in the operating environment. For instance, encoder modules, decoder modules, transform modules, or any other claimed module may be implemented by processor 202, chipset 204, memory 206, storage device 208, graphics adapter 212, or by an additional component not displayed such as a specialized hardware module to implement the functionality described below with regards to FIGS. 3 through 6, which may or may not be external to the computer. The term "module" described herein refer hardware, firmware, software or a combination thereof embodied as various components described in FIG. 2. A module is typically stored on a computer-readable storage medium such as the storage device 208, loaded into the memory 206, and executed by the processor 202.

Example of Encoder Architecture

Figure 3:
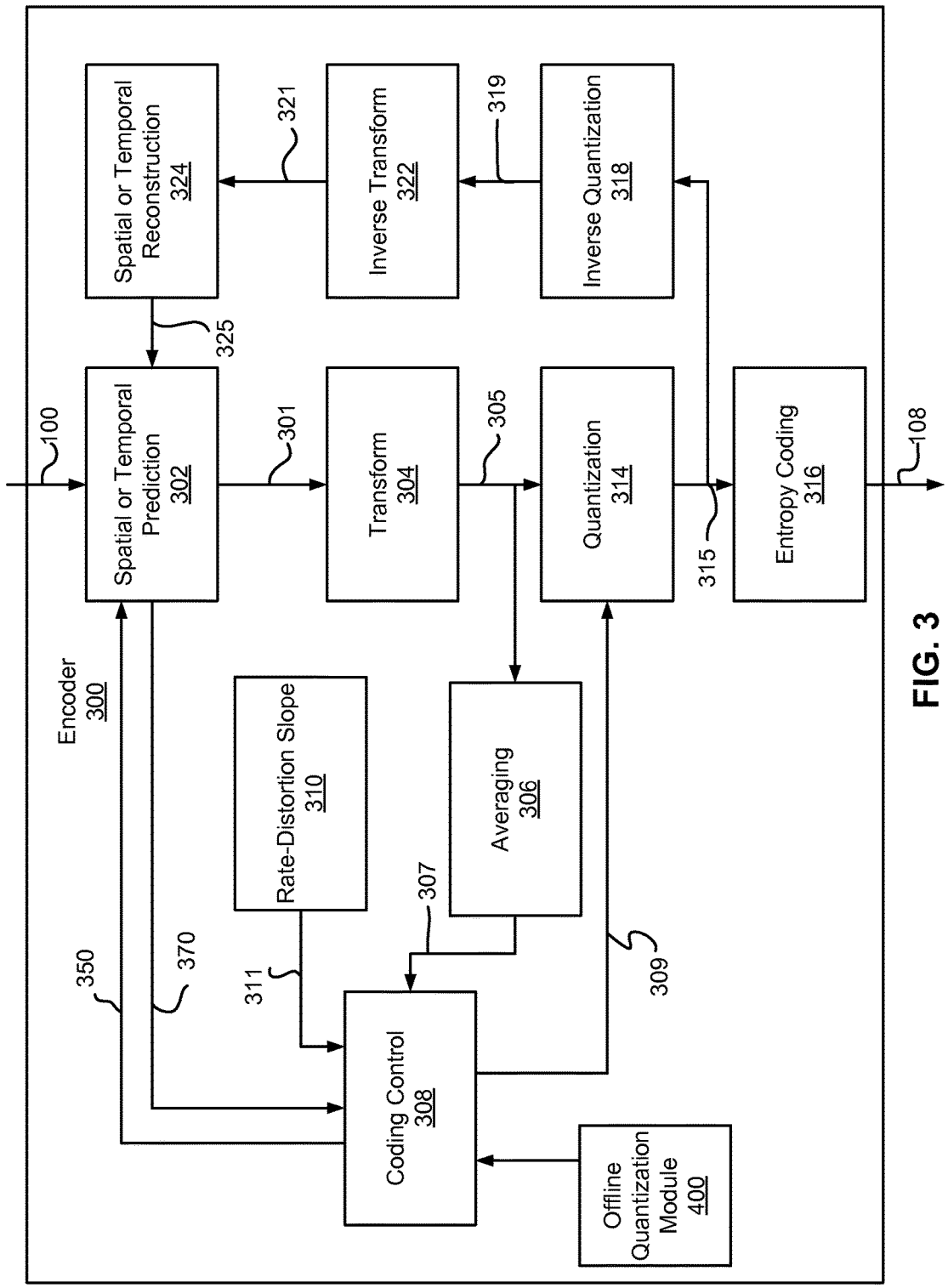
FIG. 3 is a block diagram illustrating an encoder in accordance with one embodiment.

FIG. 3 is a block diagram illustrating modules within an encoder 300 in accordance with one embodiment. The encoder 300 receives the raw frame 100, processes the raw frame 100 by a series of modules (e.g., spatial or temporal prediction module 302, transform module 304, quantization module 314 and entropy coding module 316). As a result, the encoder 300 generates and output the compressed frame 108. One or more of these modules may be embodied in hardware, software, firmware or a combination thereof.

In addition to the series of modules for processing the raw frame 100, the encoder 300 also includes (i) modules for determining operating parameters for the series of modules and (ii) modules for reconstructing a decoded version of the video frame from the compressed frame 108. The modules for determining operating parameters may include, among other components, coding control module 308, rate-distortion slope module 310, averaging module 306 and offline quantization module 400. The modules for reconstructing the decoded version of the video frame may include, among other components, inverse quantization module 318, inverse transform module 322, and spatial or temporal reconstruction module 324. One or more of these modules may be embodied in hardware, software, firmware or a combination thereof.

The spatial or temporal prediction module 302 calculates a residual block of data 301 from the current video frame that is to be encoded and the previously encoded frame. By indicating the change in video frames rather than the entire video frame to be encoded, the residual block of data is able to reduce the amount of data that is to be encoded to transmit the video frame. The spatial or temporal prediction module 302 may be capable of operating in more than one coding modes. The coding mode of the spatial or temporal prediction module 302 may be selected by the coding control module 308. Moreover, the spatial or temporal prediction module 302 generates and sends block model parameter 370 (i.e., per-block statistics) to the coding control 308.

The transform module 304 receives the residual block data 301 from the special or temporal prediction module 302 and outputs a transformed block of transform coefficients 305 for quantization and averaging.

The averaging module 306 receives transform coefficients 305 from the transform module 304 and determines averaged block data 307. In one embodiment, the averaging module 306 sums the transformed coefficients 305 and generates the averaged or summed version 307 of the transformed coefficients 305. The summed version 307 becomes part of the block model parameters and is passed to the coding control 308 to determine the operating parameters in the encoder 300.

The coding control module 308 determines and outputs one or more operating parameters such as (i) quantization thresholds 309 for use by the quantization module 314 and inverse quantization module 318, and (ii) selection 350 of coding modes for spatial or temporal prediction module 302 based on block model parameters computed by the averaging module 306. Quantization parameters stored in the offline quantization module 400 are selected which best match the block model parameters. The coding control module 308 also sends data to the rate-distortion slope module 310 for selecting a Lagrange multiplier value (i.e., a rate-distortion slope). For such operation, the coding control module 308 receives input from the offline quantization module 400, per-block statistics 370 from the spatial or temporal prediction module 302, per-frame averaged block statistics 307 from the averaging module 306, and the rate-distortion slope 311 from the rate-distortion slope module 310.

The coding control module 308 may retrieve suitable quantization thresholds from the offline quantization module 400 in response to sending block model parameters to the offline quantization module describing properties or parameters of the current frame and/or previous frames. The operation of the coding control 308 and the offline quantization module 400 for determining the quantization thresholds are described below in detail with reference to FIG. 4.

The rate-distortion slope module 310 receives data describing video frames on a per-frame basis and selects a Lagrange multiplier value (i.e., a rate-distortion slope) used for determining a coding mode and quantization thresholds, as described above in detail with reference to FIG. 1.

The quantization module 314 performs quantization on the residual of the current video frame. Specifically, the quantization module 314 maps the residual data of the current video frame to a set of entropy coding alphabet symbols according to the transform coefficients 305 received from the transform module 304 and the quantization thresholds 309 received from the coding control module 308. The quantization thresholds 309 define to what level values are quantized, and quantization invariants define which values remain the same after both quantization and de-quantization.

Scalar quantization processes use a number of quantization levels for encoding. For example, a set of quantization thresholds $t_k$ and quantization invariants $I_k^L$ associated with a codec may satisfy $I_k^L = L \cdot Q_k$, where L represents a quantization level. For a given transformed residual image coefficient $\hat{r}_k$, where $I_k^L - t_k \cdot Q_k \leq r_k < I_k^{L+1} - t_k \cdot Q_k$, $\hat{r}_k$ is mapped to quantization level L. Typically, many higher frequency coefficients are rounded to zero, reducing the digital footprint of the compressed frame 108. The quantization module 314 may also determine and output quantization invariants $I_k^L$ and quantization thresholds $t_k$.

Entropy coding module 316 codes the data 315 as quantized by the quantization module 314 and sends out the coded data, using a method as well known in the art.

The inverse quantization module 318 generates reconstructed transform coefficients 319 and transmits them to the inverse transform module 322. The inverse transform module 322 performs an inverse transformation on the reconstructed transform coefficients 319 according to the coding standard to generate inverse transformed coefficients 321. The spatial or temporal reconstruction module 324 restores the coded representation of the input video frame 325 according to the active coding standard using the inverse transformed coefficients 321. The restored representation of the video frame is provided as reference to the spatial or temporal prediction module 302. This allows residual frame information to be calculated for a subsequent video frame.

Example Operation of Offline Quantization Module

Figure 4:
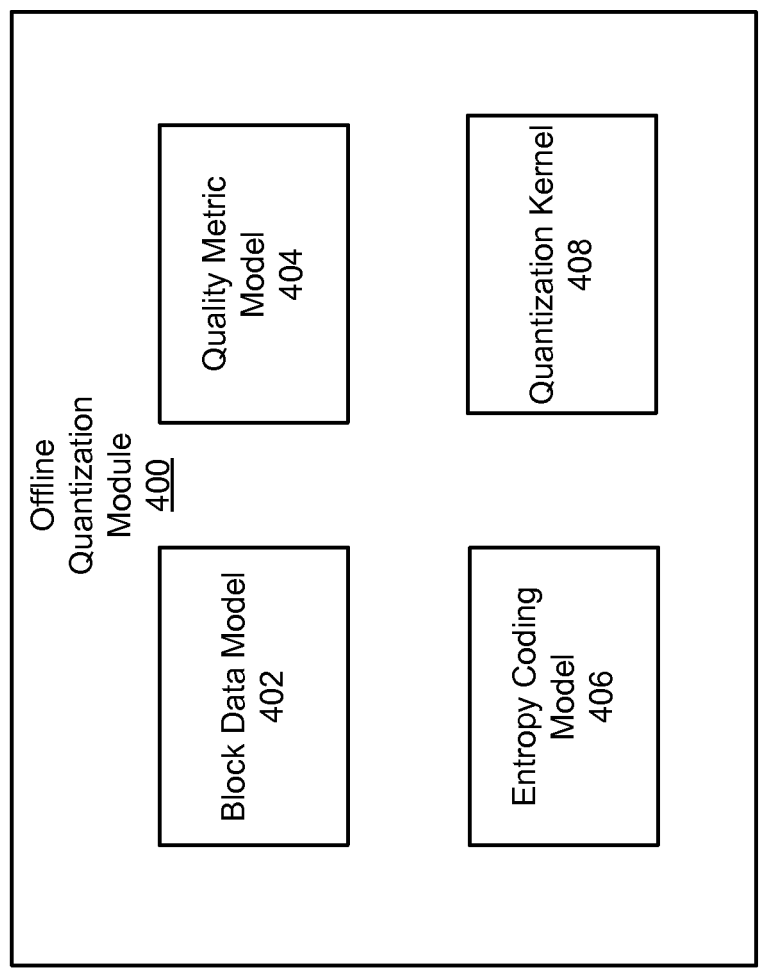
FIG. 4 is a block diagram illustrating an offline quantization module in accordance with one embodiment.

FIG. 4 is a block diagram illustrating an offline quantization module 400 in accordance with one embodiment. The offline quantization module 400 may include, among other components, a block data model 402, a quality metric model 404, an entropy coding model 406 and a quantization kernel module 408. The offline quantization module 400 generates mapping tables representing relationship of quantization parameters and corresponding rate-distortion slopes for various coding modes available to the encoder. The mapping tables are transmitted to the coding control module 308 for use in the encoding process. Additionally, in one embodiment, the content of the quantization kernel module 408 may be accessed during encoding. One or more of these modules may be implemented in hardware, software, firmware or a combination thereof.

The block data model 402 maps block model parameters to expected energy distribution over horizontal and vertical frequency domain sub-bands. That is, the block data model 402 represents a parametric model that maps block model parameters of the raw frames to quantization thresholds appropriate for encoding the raw frames.

In one embodiment, the block data model 402 stores, for a set of given block model parameters, quantization thresholds corresponding to minimized version of Lagrangian cost function, as represented by the following equation.

$$\sum_{j=0}^{NM-1} \sum_{c \in C^j} P_c^j \sum_{l=0}^{\infty} \int_{t_l^{j,c}}^{t_{l+1}^{j,c}} D(x_j, Q_{l,j,c}^{-1}(Q_{T_{j,c}}(x_j))) + \Lambda |v_{l,c}| d\mu^j, \quad (1)$$

where N represents the number of columns in a block, M represents the number of rows in the block, $C^j$ represents a set of possible coding contexts for the j-th coefficient, $P_c^j$ represents probability of coding context C for the j-th coefficient of the parametric model for a selected block model, $x_j$ represents coefficient in the block, Q represents a scalar quantization process, $Q^{-1}$ represents an inverse quantization process, $T^{j,c}$ represents a set of thresholds associated with ascending values $t_l^{j,c}$, $I^{j,c}$ represents applied invariants associated with ascending values $i_l^{j,c}$, D represents a distortion metric, $|v_{l,c}|$ the codeword length for a given level l coded under the entropy coding context c, and $\Lambda$ represents a Lagrange multiplier. For the purpose of determining quantization thresholds using equation (1), a number of typical two-dimensional data distributions on a mesh of Lagrange multiplier values may be used.

The block data model 402 is referenced by the coding control module 308 of the encoder 300 through the quantization kernel 408 to select quantization thresholds. The use of multiple parameters allows the encoder 300 to account for video frames with a wide range of parameters. In one embodiment, quantization parameters may describe a subset of a video frame such as a block, and quantization thresholds may be selected for the subset. The block model parameters submitted for retrieving the quantization threshold may include, for example, block rates and distortion values. The block model parameters may be computed by the encoder in real time per each frame being encoded. Alternatively, the block characteristics may be averaged over multiple frames. The parameterized data generated by the block data model 402 is used by the coding control module 308 to estimate parameter values based on the average transformed data collected during the coding process.

The quality metric model 404 comprises a data structure mapping a target visual quality metric to the difference in an original block and a transformed block. The target visual quality metric is identified for each block of a video frame from the original data blocks of a video frame and the coded representation of the block. The target visual quality metric is used to quantify the visual quality that can be expected with a given original block and transformed block. For example, the Peak Signal-to Noise Ratio (PSNR) may be used to represent the target visual quality metric.

In one embodiment, obtaining the PSNR includes determining the mean square error (MSE) of the video frame. In one embodiment, the process of computing PSNR includes computing the MSE for each of the plurality of blocks of the original image and the corresponding coded representation of the blocks, and averaging the computed MSE values. Alternatively, the PSNR may be computed by computing the MSE for a subset of the plurality of blocks of the original image and the corresponding blocks of the coded representation of the image. The output of the method is the visual quality of the coded representation of the image relative to the original image. The visual quality may be a unit-less ratio of distortion between the coded representation of the image and the original image, or may comprise any suitable measurement unit.

The quality metric model 404 may employ various quality metrics that are computable on a per block basis including PSNR and MSE as described above as well as video quality metric (VQM), structural similarity (SSIM) index and mean structural similarity (MSSIM) index. In one embodiment, implementations of quality metrics are used which calculate metrics for non-overlapping blocks.

The entropy coding model 406 represents a dependency between symbols and their context, and the amount of bits that are to be used for the representation of the symbols in the coded stream for a particular video coding standard. This dependency can be provided in the form of tabular or functional mapping. The mapping table stored by the entropy coding model 406 may be referenced by the coding control 308 through the quantization kernel 408 to encode a video frame using quantization parameters identified using the block data model 402.

The quantization kernel 408 retrieves mappings from the block data model 402, quality metric model 404 and entropy coding model 406, and makes the mappings available to the coding control 408 for determining a set of quantization thresholds utilized by a quantization module 314.

Example Video Encoding Process

Figure 5:
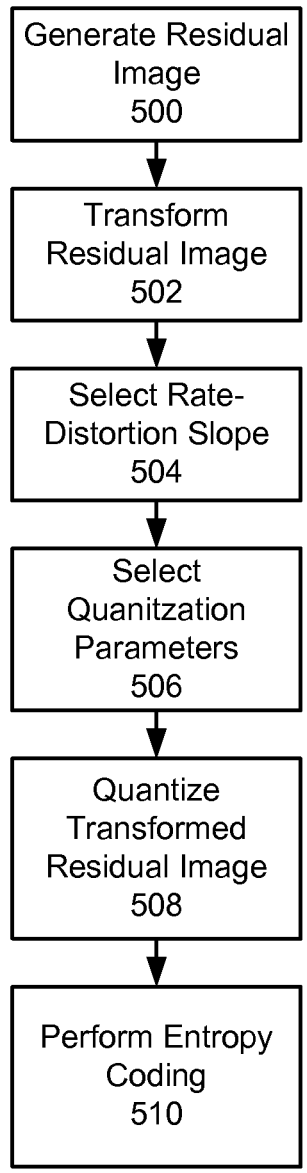
FIG. 5 is a flowchart illustrating a method of performing video encoding, according to one embodiment.

FIG. 5 is a flowchart illustrating a method of performing video encoding, according to one embodiment. The spatial or temporal prediction module 302 receives a raw frame 100 for encoding. The spatial or temporal prediction module 302 generates 500 a residual image 301 of the raw frame 100 by selecting a prediction image with similar features to the raw image of the video frame and subtracting the prediction image from the raw image.

The transform module 304 then transforms 502 the residual image 301 to produce transformed coefficients 305 in a transform domain (e.g., frequency domain). In one embodiment, a set of coefficients is produced for each block of pixels (e.g., 4×4 pixels or 8×8 pixels).

The rate-distortion slope module 310 then selects 504 a rate-distortion slope, as described above in detail with reference to FIG. 1.

The coding control 308 (or the offline quantization module 400) then selects 506 quantization parameters. For this purpose, the coding control module 308 transmits block model parameters to the quantization kernel 408 of the offline quantization module 400. The quantization kernel 408 retrieves appropriate quantization parameters from the parametric model stored in the block data model 402. When a codec uses different quantization levels, the encoder 300 determines the quantization level using equation $I_k^L = L \cdot Q_k$, as described above in detail with reference to FIG. 3.

The entropy coding module 316 then receives the quantization levels and performs 510 entropy coding to form a compressed frame 108.

Some process of FIG. 5 may be omitted. For example, a fixed rate distortion slope may be used instead of selecting 504 the rate distortion slope for different raw frames.

Offline Quantization Parameters Optimization

Figure 6:
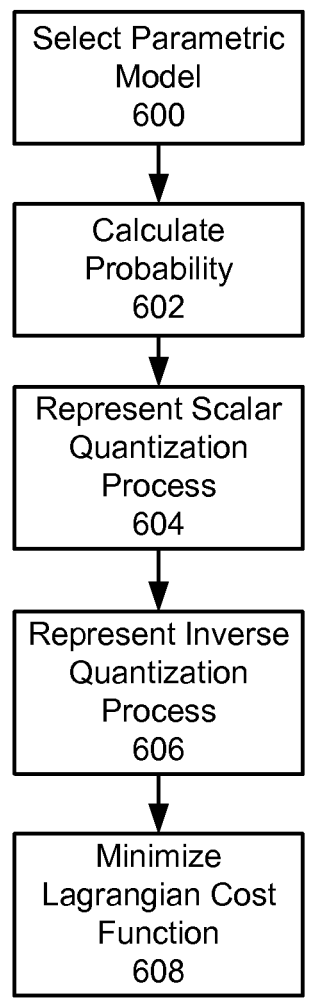
FIG. 6 is a flowchart illustrating a method of determining optimized quantization parameters through minimizing a Lagrangian cost function.

FIG. 6 is a flowchart illustrating a method of determining quantization parameters by minimizing a Lagrangian cost function in a offline process. An example of the cost function is described above as equation (1).

First, a parametric model $\mu^j$ is selected 600 which represents a probability density function for values of the coefficient $x_j$ in a block size of N×M of a video frame being encoded. For each coding context $c \in C^j$ used in entropy coding, a probability $P_c^j$ is calculated 602 for the j-th coefficient of the parametric model. Transform coefficients of the scalar quantization process Q are represented 604 with a set $T^{j,c}$ of ascending thresholds $t_i^{j,c}$. The inverse quantization process $Q^{-1}$ is represented 606 by a set $I^{j,c}$ of ascending recoverable values $i_i^{j,c}$.

In one embodiment, the parametric model $\mu^j$ is a Laplace distribution with the parameter $\lambda_j$ depending on the position of the coefficient in the transformed block. In one embodiment, scalar quantization optimization is performed by satisfying an encoding standard with a predefined de-quantization process by minimizing the Lagrangian cost function of equation (1) with thresholds $t_i^{j,c}$ as free optimization parameters. In one embodiment, a de-quantization process comprises minimizing the Lagrangian cost function of equation (1) with recoverable values $i_i^{j,c}$ as free optimization parameters.

In one embodiment, performing rate-distortion optimization of quantization thresholds for one-pass real-time image and video encoders comprises first selecting a grid on a direct product of application domains for a set of de-quantization recoverable values, Lagrange multiplier and an estimate for the parameter of a parametric model $\mu^j$.

The offline quantization module 400 minimizes the Lagrangian cost function for each point of the grid and outputs a set of quantization thresholds corresponding to each point. The Lagrange multiplier is then determined to apply in real-time on a frame by frame basis. During the encoding of each block, an estimate is calculated for the parametric model parameter $\lambda_j$ and the set of quantization thresholds is derived using the data generated in the offline quantization module. The set of quantization thresholds is applied when performing quantization for block coefficients.

In another embodiment, performing rate-distortion optimization of quantization thresholds for a constant bit rate video encoder comprises first selecting a grid on a direct product of application domains for a set of de-quantization recoverable values, Lagrange multiplier and an estimate for the parameter of a parametric model µ$^j$. An offline quantization module 400 minimizes the Lagrangian cost function for each point of the grid and outputs a block distortion and a block rate corresponding to the set of quantization thresholds at each point of the grid. The Lagrange multiplier is set to a predefined initial value during the encoder initialization. Subsequently, when encoding each frame with a target bitrate T, a lower (L) and upper (U) bound for bitrate output are set. U is a value greater than T which may be selected arbitrarily by the encoder, or selected based on limiting characteristics of an output channel. In one embodiment, L is set to 0, but may be set to any value lower than T at the discretion of the encoder. The total frame distortion D$_*$ and rate R$_*$ are summed using information collected from the offline quantization module and average frame statistics for blocks having various values for the parameter $\lambda_j$ in various coding modes. Lagrange multiplier bounds for the current frame are calculated using equations (2) and (3).

$$\Lambda_L = R_*^{-1}(L) \quad (2)$$

$$\Lambda_U = R_*^{-1}(U) \quad (3)$$

If $D_*(\Lambda_U)$ is greater than the distortion $D_p$ achieved for the previous frame, the Lagrange multiplier for the current frame is set to $\Lambda_U$. If $D_*(\Lambda_L)$ is less than $D_p$, the Lagrange multiplier is set to $\Lambda_L$. If neither condition is satisfied, the Lagrange multiplier is set to a value of $D_*^{-1}(D_p)$. After the encoding of a frame, the statistics on the amount of blocks within a frame having various values of the parameter $\lambda_j$ are then updated for each coding mode.

The above description is included to illustrate the operation of certain embodiments and is not meant to limit the scope of the disclosure. The scope of the disclosure is to be limited only by the following claims. From the above discussion, many variations will be apparent to one skilled in the relevant art that would yet be encompassed by the spirit and scope of the disclosure.

The invention claimed is:

1. A method of processing a video frame, comprising:
   determining quantization parameters corresponding to Lagrangian multiplier values offline by computing a Lagrangian cost function including a Lagrange multiplier;
   storing the quantization parameters corresponding to the Lagrangian multiplier values offline; and
   encoding the uncompressed video frame by using the stored quantization parameters, the encoding comprising:
      receiving an uncompressed video frame after storing the quantization parameters;
      determining block model parameters of the uncompressed video frame responsive to receiving the uncompressed video frame, the block model parameters representing properties to be calculated or approximated from one or more macroblocks in the uncompressed video frame;
      selecting a Lagrange multiplier value corresponding to the uncompressed video frame based on the determined block model parameters;
      generating a plurality of transform coefficients of the uncompressed video frame; and
      selecting quantization parameters for each of the plurality of blocks based on the selected Lagrange multiplier value.

2. The method of claim 1, wherein the quantization parameters include a set of quantization thresholds and a set of quantization invariants.

3. The method of claim 1, wherein the quantization parameters are selected in real-time during encoding of the video frame.

4. The method of claim 3, wherein a rate-distortion slope is selected for the video frame in real-time based on the selected Lagrange multiplier value.

5. The method of claim 1, wherein determining the quantization parameters comprises selecting a grid on a direct product of application domains for a set of de-quantization recoverable values, Lagrange multiplier and an estimate for a parameter of a parametric model.

6. The method of claim 5, wherein determining the quantization parameters further comprises minimizing the Lagrangian cost function for each point of the grid, and outputs a block distortion and a block rate corresponding to the set of quantization thresholds at each point of the grid.

7. The method of claim 1, wherein the Lagrangian cost function is represented as:

$$\sum_{j=0}^{NM-1} \sum_{c \in C^j} P_c^j \sum_{l=0}^{\infty} \int_{t_l^{j,c}}^{t_{l+1}^{j,c}} D(x_j, Q_{l,j,c}^{-1}(Q_{T,j,c}(x_j))) + \Lambda |v_{l,c}| d\mu^j,$$

where N represents a number of columns in a macroblock, M represents a number of rows in the macroblock, $C^j$ represents a set of possible coding contexts for j-th coefficient, $P_c^j$ represents probability of coding context C for the j-th coefficient for a selected block model, $x_j$ represents a coefficient in the macroblock, Q represents a scalar quantization process, $Q^{-1}$ represents an inverse quantization process, $T^{j,c}$ represents a set of thresholds associated with ascending values $t_l^{j,c}$, $I^{j,c}$ represents applied invariants associated with ascending values $i_l^{j,c}$, D represents a distortion metric, $|v_{l,c}|$ is a codeword length for a given level l coded under context C, and $\Lambda$ represents the Lagrange multiplier.

8. An encoder for encoding a video frame, the encoder comprising a memory and a processor coupled to the memory, the processor configured to:
   determine quantization parameters corresponding to Lagrangian multiplier values offline by computing a Lagrangian cost function including a Lagrange multiplier;
   storing the quantization parameters corresponding to the Lagrangian multiplier values offline; and
   encode the uncompressed video frame based on the stored quantization parameters by at least:
      receiving an uncompressed video frame after storing the quantization parameters;
      determining block model parameters of the uncompressed video frame responsive to receiving the uncompressed video frame, the block model parameters representing properties to be calculated or approximated from one or more macroblocks in the uncompressed video frame;
      selecting a Lagrange multiplier value corresponding to the uncompressed video frame based on the determined block model parameters;
      generating a plurality of transform coefficients of the uncompressed video frame; and selecting quantization parameters for each of the plurality of blocks based on the selected Lagrange multiplier value.

9. The system of claim 8, wherein the quantization parameters include a set of quantization thresholds and a set of quantization invariants.

10. The system of claim 8, wherein the quantization parameters are selected in real-time during encoding of the video frame.

11. The system of claim 10, wherein a rate-distortion slope is selected for the video frame in real-time based on the selected Lagrange multiplier value.

12. The encoder of claim 8, wherein the processor is further configured to determine the quantization parameters by selecting a grid on a direct product of application domains for a set of de-quantization recoverable values, Lagrange multiplier and an estimate for a parameter of a parametric model.

13. The encoder of claim 12, wherein the processor is further configured to determine the quantization parameters further by minimizing the Lagrangian cost function for each point of the grid, and outputs a block distortion and a block rate corresponding to the set of quantization thresholds at each point of the grid.

14. The encoder of claim 8, wherein the Lagrangian cost function is represented as:

$$\sum_{j=0}^{NM-1} \sum_{c \in C^j} P_c^j \sum_{l=0}^{\infty} \int_{t_l^{j,c}}^{t_{l+1}^{j,c}} D(x_j, Q_{l,j,c}^{-1}(Q_{T^{j,c}}(x_j))) + \Lambda|v_{l,c}|d\mu^j,$$

where N represents a number of columns in a macroblock, M represents a number of rows in the macroblock, $C^j$ represents a set of possible coding contexts for j-th coefficient, $P_c^j$ represents probability of coding context C for the j-th coefficient for a selected block model, $x_j$ represents a coefficient in the macroblock, Q represents a scalar quantization process, $Q^{-1}$ represents an inverse quantization process, $T^{j,c}$ represents a set of thresholds associated with ascending values $t_l^{j,c}$, $I^{j,c}$ represents applied invariants associated with ascending values $i_l^{j,c}$, D represents a distortion metric, $|v_{l,c}|$ is a codeword length for a given level l coded under context C, and $\Lambda$ represents the Lagrange multiplier.

15. A non-transitory computer-readable storage medium storing instruction executable by a processor, the instructions when executed cause the processor to:
    determine quantization parameters corresponding to Lagrangian multiplier values offline by computing a Lagrangian cost function including a Lagrange multiplier;
    store the quantization parameters corresponding to the Lagrangian multiplier values offline; and
    encode the uncompressed video frame based on the stored quantization parameters by at least:
        receiving an uncompressed video frame after storing the quantization parameters;
        determining block model parameters of the uncompressed video frame responsive to receiving the uncompressed video frame, the block model parameters representing properties to be calculated or approximated from one or more macroblocks in the uncompressed video frame;
        selecting a Lagrange multiplier value corresponding to the uncompressed video frame based on the determined block model parameters;
        generating a plurality of transform coefficients of the uncompressed video frame; and
        selecting quantization parameters for each of the plurality of blocks based on the selected Lagrange multiplier value.

16. The non-transitory computer-readable storage medium of claim 15, wherein the quantization parameters include a set of quantization thresholds and a set of quantization invariants.

17. The non-transitory computer-readable storage medium of claim 15, wherein the quantization parameters are selected in real-time during encoding of the video frame.

18. The non-transitory computer-readable storage medium of claim 17, wherein a rate-distortion slope is selected for the video frame in real-time based on the selected Lagrange multiplier value.

19. The non-transitory computer-readable storage medium of claim 15, wherein the Lagrangian cost function is represented as:

$$\sum_{j=0}^{NM-1} \sum_{c \in C^j} P_c^j \sum_{l=0}^{\infty} \int_{t_l^{j,c}}^{t_{l+1}^{j,c}} D(x_j, Q_{l,j,c}^{-1}(Q_{T^{j,c}}(x_j))) + \Lambda|v_{l,c}|d\mu^j,$$

where N represents a number of columns in a macroblock, M represents a number of rows in the macroblock, $C^j$ represents a set of possible coding contexts for j-th coefficient, $P_c^j$ represents probability of coding context C for the j-th coefficient for a selected block model, $x_j$ represents a coefficient in the macroblock, Q represents a scalar quantization process, $Q^{-1}$ represents an inverse quantization process, $T^{j,c}$ represents a set of thresholds associated with ascending values $t_l^{j,c}$, $I^{j,c}$ represents applied invariants associated with ascending values $i_l^{j,c}$, D represents a distortion metric, $|v_{l,c}|$ is a codeword length for a given level l coded under context C, and $\Lambda$ represents the Lagrange multiplier.

* * * * *